Patented Jan. 19, 1932

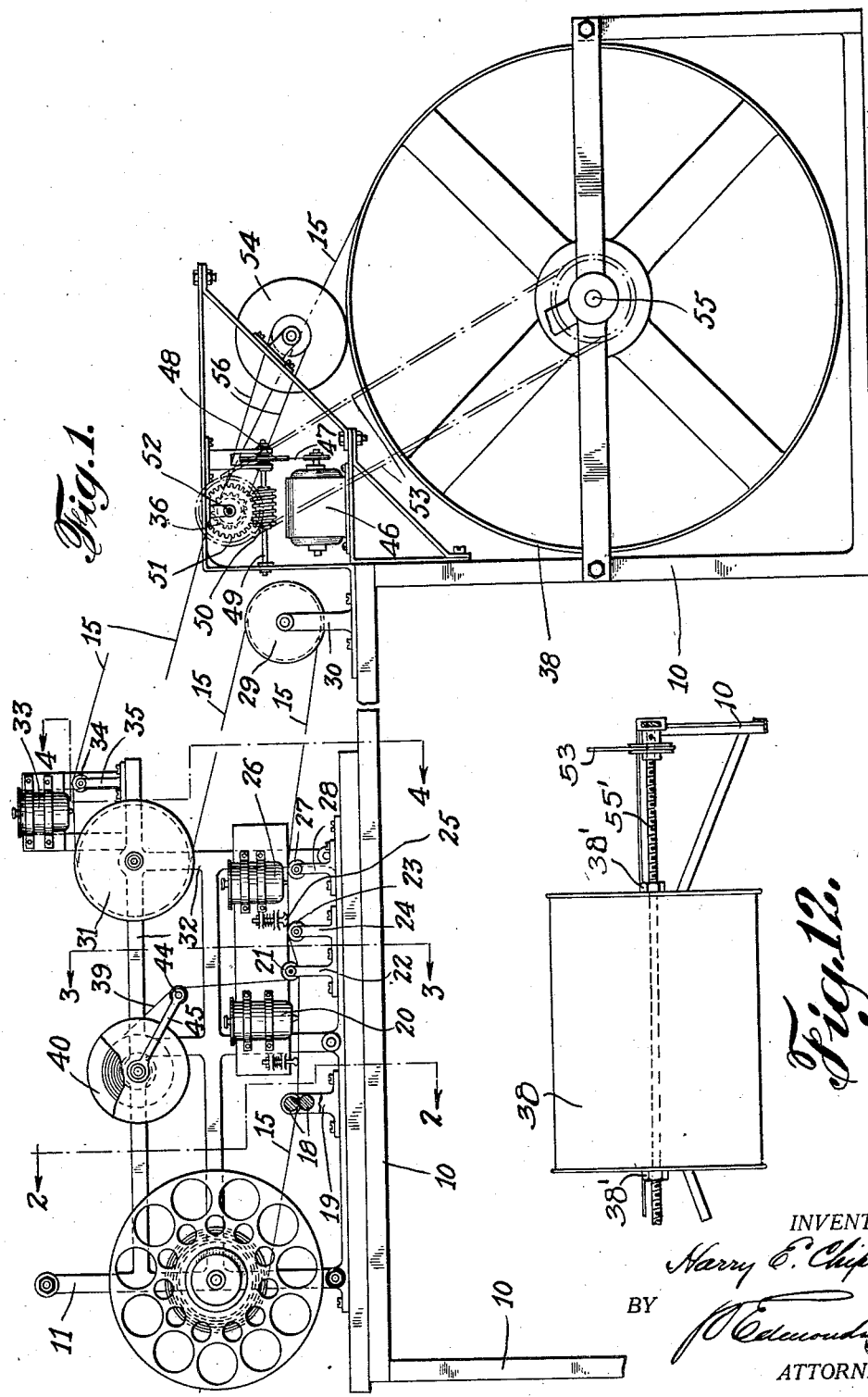

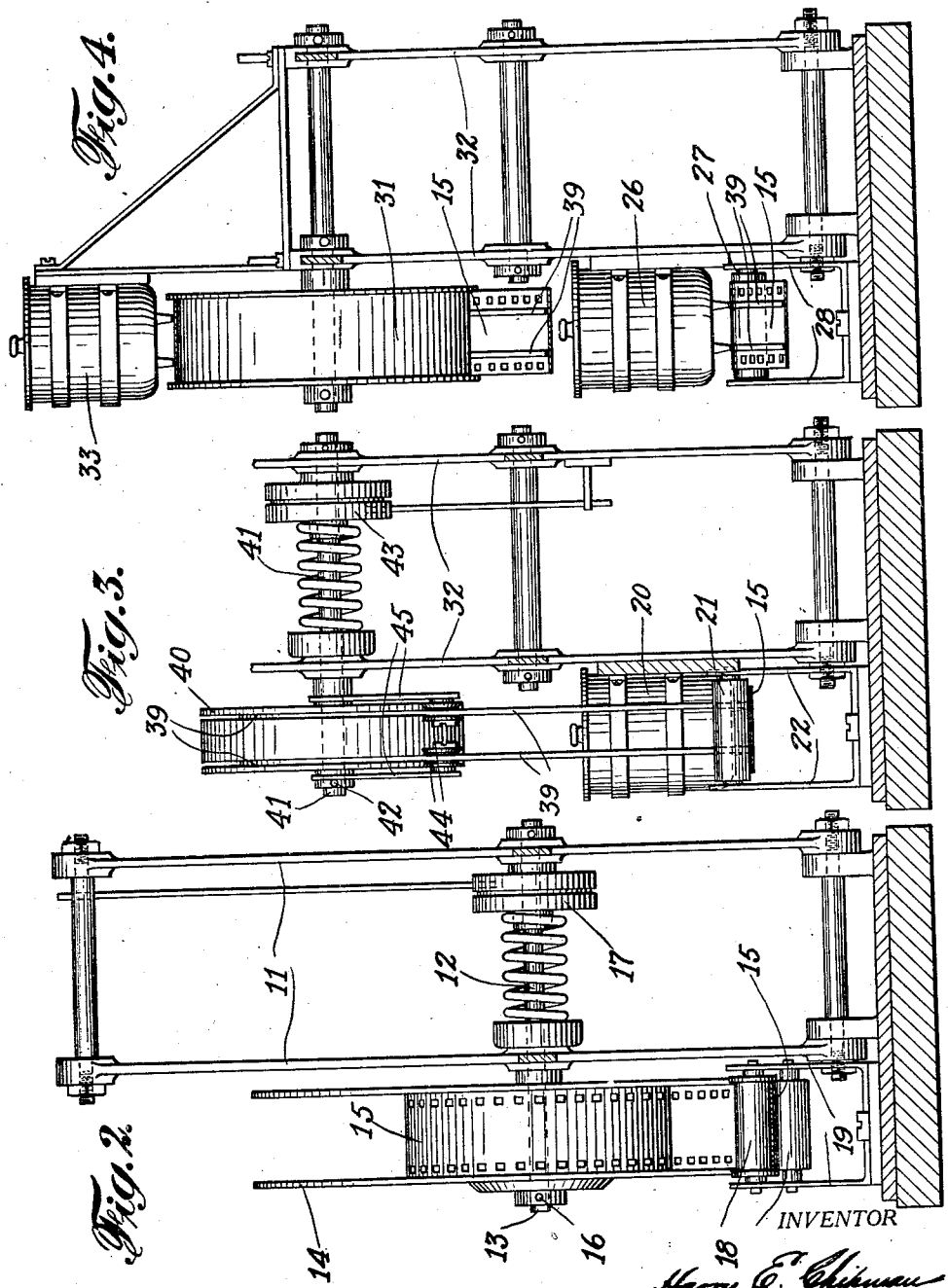

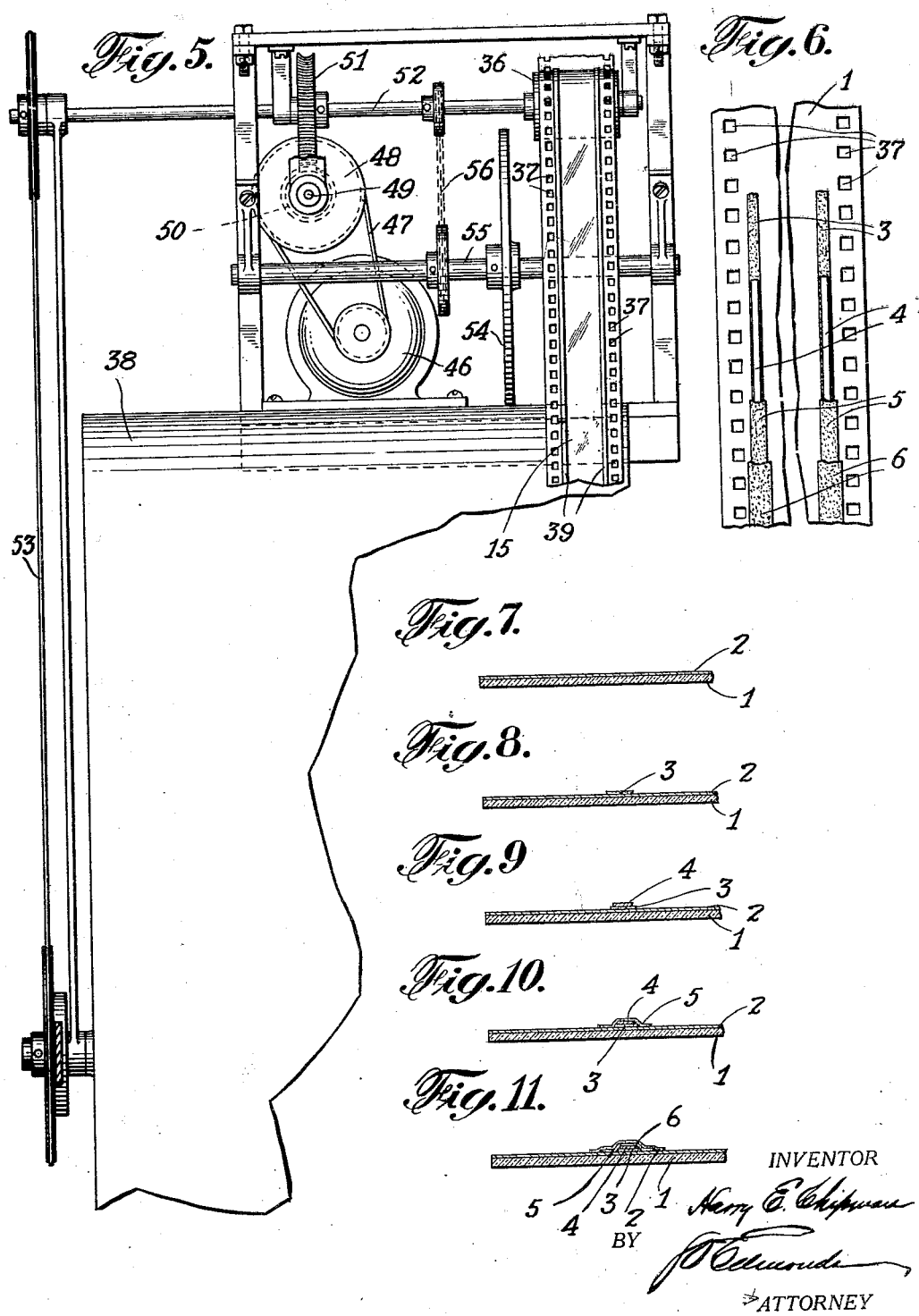

1,841,595

UNITED STATES PATENT OFFICE

HARRY E. CHIPMAN, OF SPRINGFIELD, MASSACHUSETTS, ASSIGNOR, BY DIRECT AND MESNE ASSIGNMENTS, TO ANDREW LE ROY CHIPMAN, OF NEW YORK, N. Y.

APPARATUS FOR MAKING TALKING MOTION PICTURE FILM

Application filed March 12, 1924. Serial No. 698,583.

This invention relates to method of and apparatus for making talking motion picture film.

In an application filed by me January 26, 1921, Serial No. 439,912, I have disclosed a process and apparatus for producing and reproducing talking motion pictures by means of a film which is substantially the same as an ordinary motion picture film, except that the film carries longitudinally along its length one or more magnetizable metallic ribbons by means of which sounds may be produced and reproduced.

The principal object of this invention is to provide a method and apparatus for making quickly, efficiently, and without great expense, talking motion picture film, which is especially well suited for the production and reproduction of talking motion pictures, and which will withstand handling and use without injury or impairment to its talking properties, and a film which is simple and durable in construction. Other objects of my invention will be in part obvious and in part pointed out hereinafter.

In carrying out my method, I take a motion picture film, preferably of any ordinary type, adapted for the production and reproduction of motion pictures, and securely attached lengthwise on this film one or more strips of magnetizable material, such as spring steel, which is suitable for the production and reproduction of sounds. The talking material is so placed on the motion picture film as not to interfere with picture production and reproduction. I have found that the metallic talking ribbon may be attached to the motion picture film in a suitable manner by means of a bond comprising cementitious material, preferably using three coatings or layers of this material, one applied between the motion picture film and the talking ribbon and two layers subsequently flowed over the applied ribbon.

A suitable apparatus for making such talking motion picture film may comprise an apparatus for suitably cementing the talking ribbon on the film, the apparatus preferably being adapted to operate continuously while advancing motion picture film and the talking strips from suitable reels simultaneously through the machine, and feeding the talking motion picture film so produced onto a suitable drying drum for the final drying of the cement.

The invention accordingly consists in the features of construction, combinations of elements and arrangement of parts which will be exemplified in the construction hereinafter set forth and the scope of the application of which will be indicated in the following claims.

In order that a clearer understanding of my invention may be had, attention is hereby directed to the accompanying drawings forming a part of this application and illustrating one possible embodiment of my invention. Referring to the drawings, Fig. 1 is a diagrammatical side elevation of an apparatus for producing talking motion picture film; Fig. 2 is a vertical sectional view of the apparatus and is taken on the line 2—2 of Fig. 1; Fig. 3 is a vertical sectional view of the apparatus and is taken on the line 3—3 of Fig. 1; Fig. 4 is a vertical sectional view of the apparatus and is taken on the line 4—4 of Fig. 1; Fig. 5 is an end view of a portion of the apparatus; Fig. 6 is a diagrammatic view of the film, illustrating the several steps of the method of production, the film being shown broken apart longitudinally along its center; Fig. 7 is a sectional view of a fragment of the motion picture film alone; Fig. 8 is a similar view of the film showing the first layer of cement applied thereto; Fig. 9 is a similar view showing the talking ribbon applied; Fig. 10 is a similar view showing a layer of cement applied over the talking ribbon; Fig. 11 is a similar view showing another and final coating of cement applied; and Figure 12 is an end view of a portion of the apparatus showing in particular the drying drum and its mounting. Similar reference characters refer to similar parts throughout the several views of the drawings.

Referring to Figs. 6 to 11 inclusive, in carrying out my method, I take a motion picture film, which may be of any usual type, having a transparent base 1, such as a suitable pyroxylin composition, carrying on one side a suitable photographic emulsion 2. The talking motion picture film comprises this motion picture film with one or more strips or ribbons of magnetizable material, such as thin spring steel, securely attached to the motion picture film, preferably on the emulsioned side thereof, and extending longitudinally along the length of the film at a place where it will not interfere with the production and reproduction of motion pictures on and from the photographic film. My process of combining such metallic ribbon and motion picture film comprises first placing a suitable ribbon of suitable cementitious substance 3, such as cement or other suitable adhesive, along the emulsioned side of the motion picture film, as shown in Figs. 6 and 8; then laying the metallic talking ribbon 4 on the cement layer 3; then, as shown in Figs. 6 and 10, placing another coat of cementitious material 5 over the ribbon 4, and when this coat 5 has become suitably dry, applying another coat 6 of cementitious material over the coating 5. The three coats of cement bond the metallic ribbon 4 in place on the motion picture film in a satisfactory and permanent manner. These steps are preferably carried out in a dark room, so as not to spoil the sensitiveness of the emulsion 2. A film produced in accordance with my invention presents the photographic emulsion in a satisfactory manner for the production and reproduction of motion pictures, and the talking ribbon 4 thereon is properly presented for the production and reproduction of sounds in exact synchronism with the pictures of the photographic film. Although I have described the method with reference to a talking motion picture film having a single talking strip, I preferably incorporate two parallel talking strips on the film, the second strip being applied in the same manner as above described.

A suitable apparatus for carrying out the above method and for producing the talking motion picture film may comprise means for feeding the motion picture film from a suitable reel; means for applying the first line of cement thereto; means for feeding the talking ribbon from a suitable reel; means for embedding the talking ribbon in this line of cement; means for flowing further cement over the laid talking ribbon; means for applying another coat of cement over the last coat after it has become sufficiently dry; and a drying drum upon which the film winds to effect the drying of the cement; the means for feeding the photographic film and talking ribbon preferably effecting the continuous feed of the photographic film and the talking strip through the apparatus in proper synchronism, and progressively winding the film on the drying drum, whereby the film is properly disposed for the drying of the cement.

Referring to Figs. 1 to 5 inclusive, the various parts of the apparatus may be mounted on a suitable table or supporting structure 10. At one end of this structure is a pair of standards 11 which carry a shaft 12, the end of which, 13, extends outside of the standards, and on which a reel 14 for motion picture film 15 may be mounted and removably secured, as by pin 16. A spring pressed friction device 17 is associated with the shaft 12 so as to frictionally impede rotation of the reel 14, and to place the film 15 under suitable tension to prevent it from unreeling too fast. From the reel 14 the film strip 15 passes between two positioning rollers 18 which are suitably carried on supports 19. The film 15 then passes beneath a suitable cement tank 20, then beneath a roller 21, which is supported by standards 22, then over a guide roller 23, which is rotatably mounted on standards 24, then under a spring pressed plunger 25 which bears downwardly on the upper surface of the film, then beneath a second cement tank 26, and then over a guide roller 27 rotatably supported on standards 28. From this point the strip 15 traverses some distance through the air, then turns about a pulley 29 carried on standards 30, then returns and passes around pulley 31 supported on a frame 32, by which time the second cement coat has become partially dry, and the film passes beneath a third cement tank 33 and over a roller 34, which is mounted on standards 35. From here the strip 15 passes into engagement with a take-up sprocket 36 of usual construction, having teeth which engage in the sprocket holes 37 of the film strip. From this sprocket strip 15 feeds onto a rotatably mounted drying drum 38.

The talking ribbon 39, of suitable magnetizable material, such as special high carbon spring steel, is carried on reel 40, which is mounted on a shaft 41 and is removably fixed thereto, as by pin 42. Shaft 41 is rotatably mounted in the framework 32 and has associated therewith a suitable friction device 43 which impedes the rotation of the reel 40 to place proper tension on the ribbon 39 as it unwinds from the reel and prevents the ribbon from unreeling too fast. From the reel 40 the ribbon 39 passes over guide rollers 44 which are carried on arms 45, and then passes downward and beneath the roller 21, whereby it is superimposed in proper position and location on the photographic strip 15 and on the first application of cement placed on the film by the cement tank 20. From this point the ribbon 39 moves with the strip 15 in integral relation therewith. The pressure member 25 presses the strip 39 firmly into the first cement coating or line and against the strip 15. The cement tank 26 applies a coating or line of cement over the strip 39 as it moves under this tank. This coating dries to a suitable extent during the time which elapses while the film passes from this tank to the tank 33. Then, as the film travels along, the tank 33 applies another coating or line of cement over the coating supplied by the tank 26.

The motion picture film 15 and the talking ribbon 39 are continuously drawn from their respective reels and through the apparatus by means of a suitable power device which may be driven either manually, mechanically or electrically. Preferably I employ an electric motor 46. This motor has a belt drive connection 47 with a pulley 48 fixed on a suitably mounted rotatable shaft 49. A worm 50 on this shaft is in mesh with a worm gear 51 secured to another rotatable shaft 52, on which is fixed the drive sprocket 36 which engages the perforations 37 in the film and which, when rotating, pulls the film through the apparatus. The rotatably mounted drying drum 38 may also be driven from this shaft 52 by means of a friction wheel 54, which rests on the outer surface of the drum, the wheel being secured to a suitably mounted rotatable shaft 55, which is rotated from the shaft 52 through a suitable belt connection 56, the speed of rotation of the drum being, of course, appropriate to the rate of speed of the film by the sprocket 36. The belt 53 and the pulleys move the drum in a horizontal direction in exact proportion as the friction pulley 54 drives the drum rotatably. The shaft 55' which passes through the centre of the drum is, in fact, a screw, having for a bearing at each end of the drum a threaded nut 38' through which it passes, and as the shaft or screw rotates in an opposite direction to which the friction pulley 54 rotates the drum, it moves the drum in a horizontal direction, always keeping a bare portion of the drum in line with the sprocket 36, so that as the sprocket feeds the ribbon to the drum, it will wind the film on the drum, with the layers side by side, and will not allow one layer to ride over another.

The cement tanks 20, 26 and 33 preferably discharge their contents through valves which are manually adjustable, and thereby the feed and flow of the cement from each tank may be regulated. Also, preferably, the apparatus is arranged to feed simultaneously two talking ribbons 39, and to combine both of these ribbons with the motion picture film simultaneously. To this end the various guide rollers are designed to guide both such talking strips, and each of the cement tanks is provided with two discharge nozzles so as to feed the cementitious material for both talking strips. The drawings illustrate an apparatus for incorporating such two talking strips 39 with a single photographic film 15 in such positions thereon that the photographic film will be still well suited for the production and reproduction of motion pictures, and both talking strips will be properly positioned and presented for the production and reproduction of sounds in exact synchronism with the motion pictures. It has been found that sometimes better production and reproduction of the sounds is obtained by using such two ribbons instead of a single ribbon.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In an apparatus for making sound film, in combination, means for feeding motion picture film, means for feeding talking ribbon, means for applying cementitious material to the motion picture film, means for embedding the talking ribbon in the applied cementitious material, a drying drum for the film, and means for progressively and spirally winding the film on said drum, whereby the film is properly disposed for the drying of the cement.

2. In an apparatus for making sound film, in combination, a reel for delivering motion picture film, a second reel for delivering talking ribbon, means engaging said film for feeding the film and ribbon through the apparatus simultaneously, means, comprising a cement tank, for placing a strip of cement on said film as it is fed through the apparatus, and resilient means for embedding the talking ribbon in said applied cement as the film and ribbon are fed through the apparatus.

3. In an apparatus for making sound film, in combination, a reel adapted to deliver motion picture film, a reel adapted to deliver talking ribbon, a sprocket wheel engaging said film, means for rotating said sprocket to feed the film and ribbon continuously through the apparatus, means comprising a cement tank for placing cement on said film as it is fed through the apparatus, means comprising a resilient element and a cooperating guide roller for embedding the talking ribbon in said applied cement as the film and ribbon are fed through the apparatus, means comprising a second cement tank for placing coating of cement over said applied ribbon, means comprising a third cement tank for placing a coating of cement over said last coating after said cementitious material last applied has been subjected to a drying action, a drying drum for the film, and means for rotating the drying drum in synchronism with the feed of the film and ribbon through the machine for winding the film on said drum for the drying of the cement applied thereto.

4. In an apparatus for making sound film, in combination, means for feeding motion picture film, means for applying cementitious material thereto, means for placing magnetic sound material over said cementitious material, and a pair of cooperating pressure elements for embedding said magnetic material in the cementitious material.

5. In an apparatus for making sound film, in combination, means for feeding motion picture film, means for placing a strip of cementitious material along a side edge of said film, means for embedding a magnetic sound record in said cementitious material, and means for placing a second strip of cementitious material over said magnetic material.

6. In an apparatus for making sound film, in combination, means for feeding motion picture film, means for placing a strip of cementitious material along a side edge of said film, means for embedding a magnetic sound record in said cementitious material, means for flowing a second strip of cementitious material over said sound record, and means for flowing a third strip of cementitious material over said second strip after said strip last applied has been subjected to a drying action.

7. In an apparatus for making sound film, in combination, a reel adapted to carry motion picture film, a reel adapted to carry talking ribbon, means for applying a strip of cementitious material along a side edge of said film, means for embedding said talking ribbon in said cementitious material, means associated with each of said reels operative to frictionally retard the rotation thereof and means adapted to engage the film to draw the film and ribbon continuously through the apparatus.

8. In an apparatus for making sound film, in combination, means for applying cementitious material to the picture film, means for embedding a magnetic sound record in said cementitious material, a drying drum for the film, and means for spirally winding the film on said drum.

9. In an apparatus for making sound film, in combination, means for applying cementitious material to the picture film, means for embedding a magnetic sound record in said cementitious material, a drying drum for the film, means for rotating said drum, and means for shifting said drum during the rotation thereof so as to cause the film to spirally wind thereon whereby the film is properly disposed for the drying of the cement.

10. In an apparatus for making sound film, in combination, a reel adapted to carry motion picture film, a reel adapted to carry talking ribbon, means for applying a strip of cementitious material to said film, means for embedding said talking ribbon in said cementitious material, means adapted to engage the film to draw the film and ribbon continuously through the apparatus, a drying drum for the film, and means for spirally winding the film on said drum.

This specification signed this tenth day of March, 1924.

HARRY E. CHIPMAN.